United States Patent [19]

Ariño

[11] 3,726,536

[45] Apr. 10, 1973

[54] MULTIPLE USE COLLAPSIBLE CART

[76] Inventor: Francisco Jorge De Loizara Y Ariño, Avenida del Generalisimo No. 53-7°B., Madrid, Spain

[22] Filed: Mar. 1, 1971

[21] Appl. No.: 119,582

[30] Foreign Application Priority Data

June 5, 1970 Spain.....................................159087

[52] U.S. Cl..............................280/36 C, 280/47.25
[51] Int. Cl. ...............................................B62b 1/04
[58] Field of Search.................280/36 B, 36 C, 47.25

[56] References Cited

UNITED STATES PATENTS

| 1,071,376 | 8/1913 | Watson | 280/47.25 X |
|---|---|---|---|
| 2,670,216 | 2/1954 | Leonard | 280/47.25 X |
| 2,728,580 | 12/1955 | Preisler | 280/36 B |
| 1,266,471 | 5/1918 | Howard | 280/47.18 |
| 2,449,618 | 9/1948 | Pritchard | 280/36 C |
| 3,116,069 | 12/1963 | Dostal | 280/36 B X |

FOREIGN PATENTS OR APPLICATIONS 164,328  3/1949  Austria..............................280/36 C Primary Examiner—Leo Friaglia
Assistant Examiner—John A. Pekar
Attorney—Charles E. Temko

[57] ABSTRACT

A multi purpose two wheeled cart adapted to be employed selectively as a luggage carrier, a perambulator or a shopping cart. The device includes a main chassis to which is selectively attached a detachable upper carrier element. In detached condition, the main chassis element resembles a light weight hand truck, and may be employed for transporting baggage. In similarly detached condition, the upper chassis element may be suspended from an automotive seat back to serve as an infant carrier. In interconnected relation, the upper carrier element forms a seat of a perambulator, and the floor of the main chassis forms a foot rest. The seat-forming member may be removed from the upper carrier element to form an enclosing frame for maintaining a large bag or container upon the floor of the main chassis.

8 Claims, 3 Drawing Figures

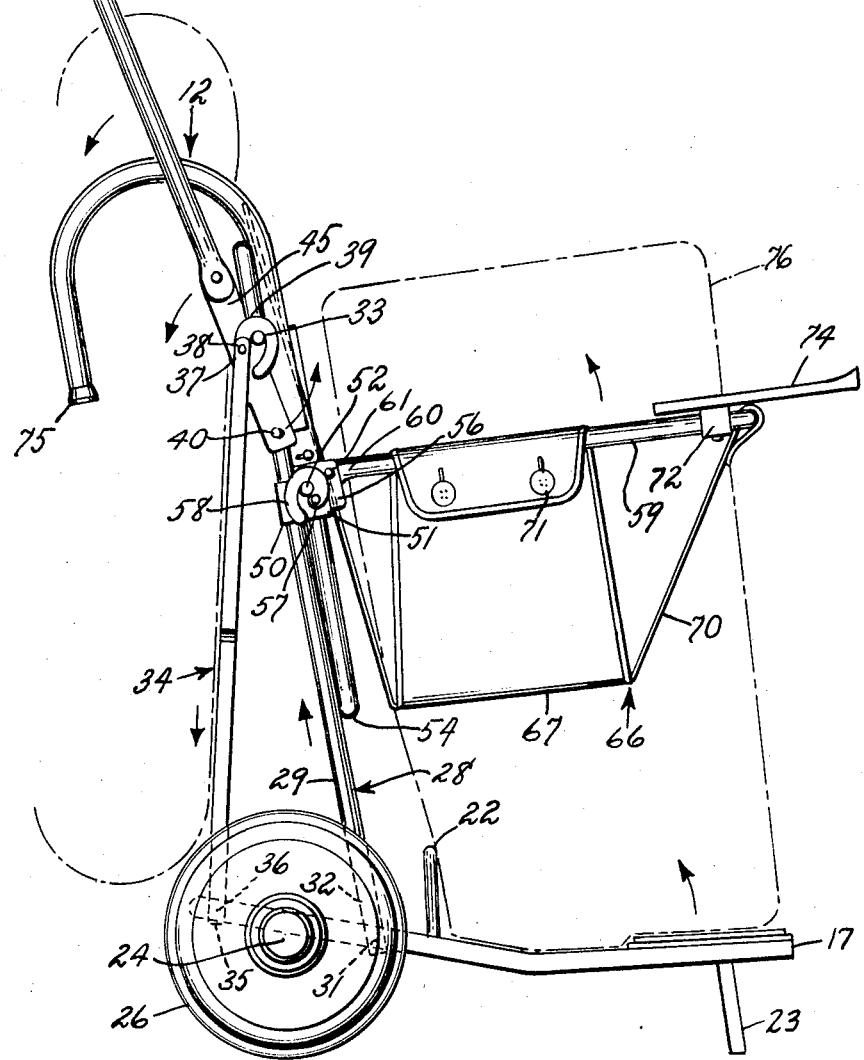
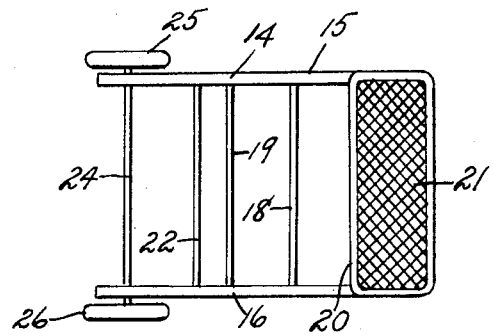
Fig.2
Fig.3

MULTIPLE USE COLLAPSIBLE CART

This invention relates generally to the field of small hand propelled vehicles adapted to be used for transporting variously sized articles, and more particularly to an improved multi purpose vehicle which can be selectively employed for a variety of transport purposes.

It is among the principal objects of the present invention to provide an improved multi purpose cart which may selectively be employed as a shopping cart, a hand truck, a luggage carrier, a perambulator, or an infant's seat for use in conjunction with an automotive seat back.

Another object of the invention lies in the provision of an improved device of the class described which may be readily collapsed to flattened or planar configuration for convenient storage when not in use.

Yet another object of the invention lies in the provision of an improved wheeled vehicle of the class described which may be fabricated at reasonably low cost, thereby permitting consequent wide sale, distribution and use.

A feature of the disclosed embodiment lies in the fact that it may be fabricated substantially entirely from light weight tubular materials, such as aluminum or steel, and, apart from relatively simple pipe bending equipment, practically no specialized tooling is involved in the manufacture of the device in mass production.

Another feature of the disclosed embodiment lies in the fact that it may be conveniently interconnected without the use of hand tools, by those possessed of only ordinary skill.

Yet another feature of the embodiment lies in the fact that the component parts thereof are capable of simultaneous separate utility.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIG. 2 is a fragmentary side elevational view thereof.

FIG. 3 is a fragmentary top plan view thereof showing a horizontal frame forming a part of a main chassis element comprising the device.

Figure 1:
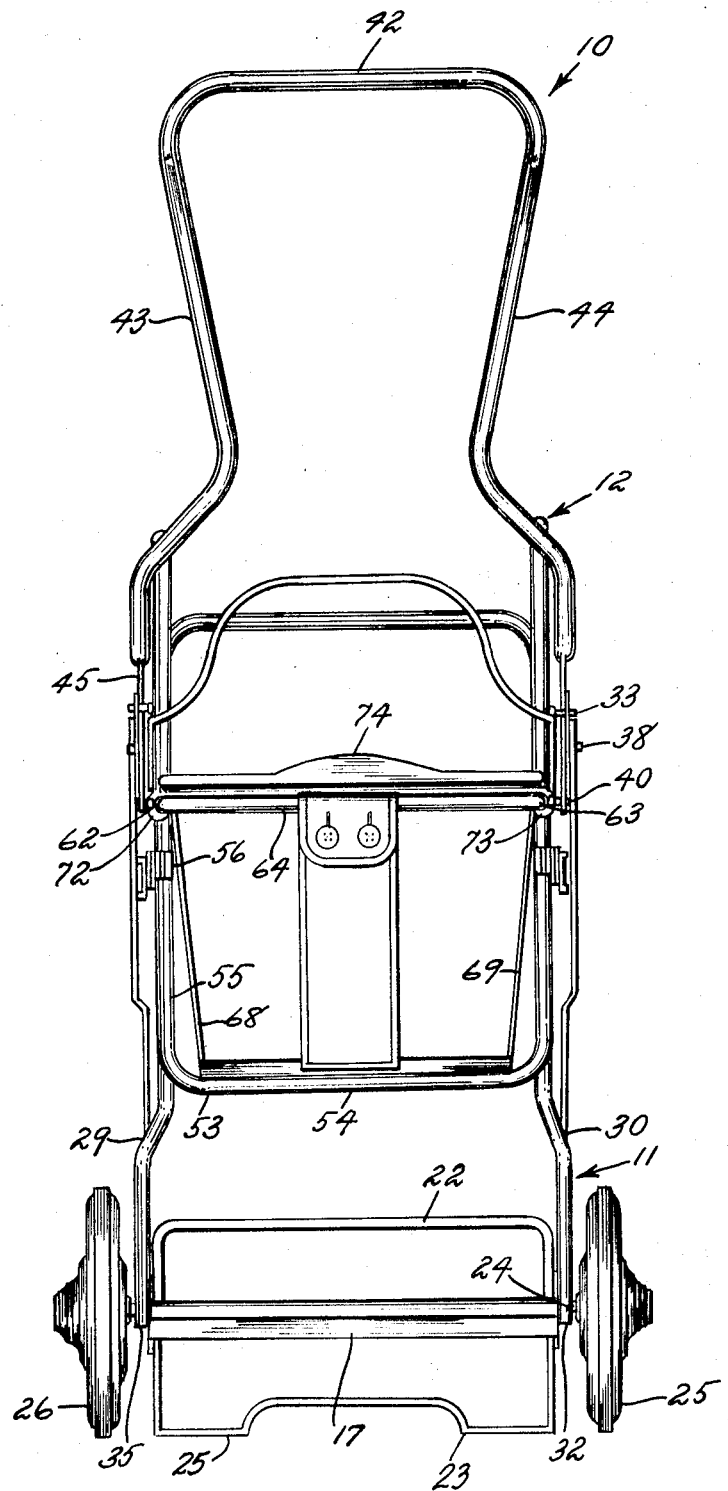
FIG. 1 is a front elevational view of an embodiment of the invention in fully assembled condition.

In accordance with the invention, the device, generally indicated by reference character 10, comprises broadly a main chassis element 11 and a detachable upper carrier element 12. Most conveniently, the elements 11 and 12 are fabricated from light weight aluminum or steel tubing, which is riveted or welded together, certain other component parts being formed from planar material, such as steel stampings, plywood, hardboard and the like.

The main chassis element 11 includes a lower frame 14 having first and second longitudinal members 15 and 16, respectively, joined at the forward end thereof by an end member 17. Transversely extending braces 18 and 19 extend between the members 15 and 16 at the medial portions thereof. A floor member 20 is mounted upon the forward portion of the frame 14, and may be covered by a rubber mat 21. Rearwardly of the braces 18 and 19 is a planar tire or wheel guard 22, the purpose of which is to prevent contact of any object carried by the floor member 20 and extending outwardly of the members 15 and 16 from contacting wheels 25 and 26. A stand 23 extends downwardly from the floor member 20 which also supports a transversely extending axle 24 upon which the above mentioned wheels 25 and 26 are mounted for rotation.

Extending upwardly from the floor member 20 is a forwardly disposed yoke-shaped frame 28 including a pair of vertical side members 29 and a transversely extending member 30. Pintles 31 interconnect the lower ends 32 of the members 30 to the frame 14. Outwardly extending pins 33 provide means for interconnection with the upper carrier element 12.

A rearwardly disposed frame 34 is mounted at the lower ends 35 thereof by pintles 36 to the carrier element 12. The upper ends 37 are provided with pintles 38 mounting swivel hooks 39 selectively engageable with the pintles 33 on the upper ends of the frame 28 to rigidify the chassis element 11 for use. Rivets 40 interconnect a handle bar 41 which may be folded about an axis through the rivets for storage. The handle bar 41 includes a transversely extending member 42 and vertical members 43 and 44 interconnected to plates 45 and 46 through which the rivets 40 pass.

The above described structure, comprising the main chassis element 11, may be used as a light weight hand truck, baggage or boxes being conveniently loadable on the floor member 20, following which the chassis is leaned leftwardly as seen in FIG. 2 by pressure upon the handle bar 41 is well known manner. The chassis element may be stored by disconnecting the swivel hooks 39, permitting the forwardly disposed frame element 28 to be moved upwardly and the rearwardly disposed frame element 34 to be moved downwardly as the lower fram 14 is placed in a relation with respect thereto where it is disposed in a substantially parallel plane. With this movement, the handle bar 41 is also folded downwardly, so that the total space occupied by the chassis element 11, when not in use, is at a minimum.

The detachable upper carrier element 12 is mounted upon the forwardly disposed frame 28 by means of clamps 50 positioned somewhat above the medial portion thereof. A forwardly extending portion 51 mounts latterly extending pins 57 for this purpose. A generally U-shaped support 53 includes a lower member 54 adjoining vertical side members 55, which mount plates 56. Swivel hooks 58 are mounted on the pins 57, and engage pins 52 on the carrier element 12, whereby the position of the support 53 is fixed by contact of the lower member 54 with the forward surfaces of the frame 28, as best seen in FIG. 2 in the drawing.

Extending forwardly from the support 53 is a pivotally mounted horizontal frame 59, the inner ends 60 of which engage rivets 61 passing through the plates 56. The frame 59 includes side members 62 and 63, and a transverse end member 64. The frame 59 may be moved to a generally vertical position, without disengaging the carrier element 12 with respect to the main chassis element 11 by the pivotal movement allowed by the rivets 61. In this condition, the device may be used as a hand truck or luggage carrier.

A replaceable flexible seat 66 comprising a bottom member 67, side members 68 and 69 and a front member 70 is attached to the horizontal frame 59 by button means 71 which form loops at the upper portions thereof. Removable clamps 72 and 73 support a tray 74 adjacent and overlying the member 64.

The upper ends 75 of the support 53 form substantially a 180° bend, to permit the same to be secured to an automotive seat back (not shown) or similar seat structure. During such use, the seat 66 and tray 74 may be positioned as shown in FIG. 2.

When it is desired to use the device as a shopping cart, the seat and tray are removed, and the frame 54 is pivoted to a horizontal position whereby it forms an enclosure for supporting a bag 76 of textile or other relatively stiff construction. This bag can be removed from the device without the necessity of unloading the same to permit it to be transferred to an automobile when shopping has been completed.

It may thus be seen that I have invented a novel and highly useful multi-purpose cart, comprising several selectively assemblable components, each of which is capable of a separate function, and when in combined condition other functions are possible. Each of the components, once separated, can be placed in substantially planar condition for convenient storage. By resort to manually operable swivel hooks, a rigid structure is obtained once the device is completely assembled. Disassembly is possible without use of any tools, and by those possessing only ordinary skill, since the device can be assembled only in the correct manner.

I wish it to be understood that I do not consider the invention limited to the precise details of structure shown and set forth in this specification, for obvious modifications will occur to those skilled in the art to which the invention pertains.

I claim:

1. Improved multi-purpose cart construction comprising: a main chassis element including a generally horizontally disposed lower frame element and a pair of generally vertically disposed frames pivotally interconnected to said lower frame at mutually spaced locations at the rear of said lower frame; said pair of vertically disposed frames having means selectively interconnecting the upper ends thereof to form a rigid unit; manually engageable handle bar means interconnected to one of said vertically disposed frames, and wheeled means extending beneath said lower frame, a detachably associated upper carrier element, said main chassis element having relatively fixed laterally-extending pintles thereon, said upper carrier element including a vertically disposed frame overlying one of said vertically disposed frames of said main chassis element, and having means engaging said pintles to maintain said upper carrier element thereon.

2. Structure in accordance with claim 1, including wheel guard means mounted on said lower frame, for preventing contact of an object placed upon said lower frame with said wheeled means.

3. Structure in accordance with claim 1, said upper carrier element including a pair of plates mounting said engaging means, and a generally U-shaped horizontally disposed frame supported by said plates.

4. Structure in accordance with claim 3, including flexible selectively detachable seat-forming means engaging said horizontally disposed frame.

5. Structure in accordance with claim 1, said upper carrier element including a pair of plates mounting said engaging means, a generally U-shaped horizontally disposed frame and pintle means pivotally interconnecting said plates and said horizontally disposed frame.

6. Structure in accordance with claim 1, including swivel hook means interconnecting said vertically disposed frames.

7. Structure in accordance with claim 1, including flexible selectively detachable seat-forming means engaging said horizontally disposed frame.

8. Structure in accordance with claim 7, said vertically disposed frame of said upper carrier element including a plurality of downwardly opening hook means for suspending said upper carrier element from a horizontally extending surface.

* * * * *